A. I. THRUN.
COOKING APPARATUS.
APPLICATION FILED JULY 14, 1917.
1,254,376.
Patented Jan. 22, 1918.
3 SHEETS—SHEET 1.
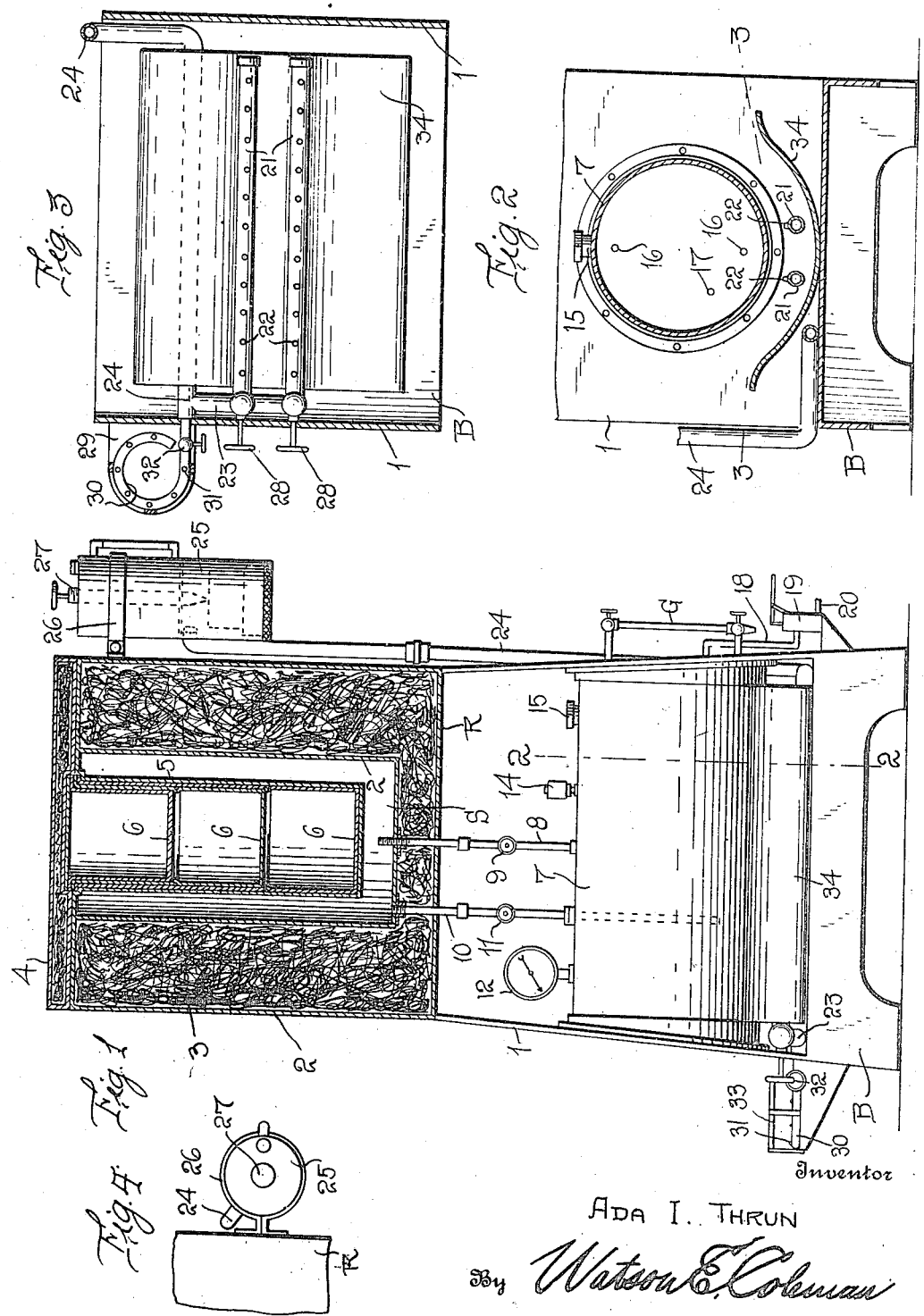
Inventor
ADA I. THRUN
By Watson E. Coleman
Attorney

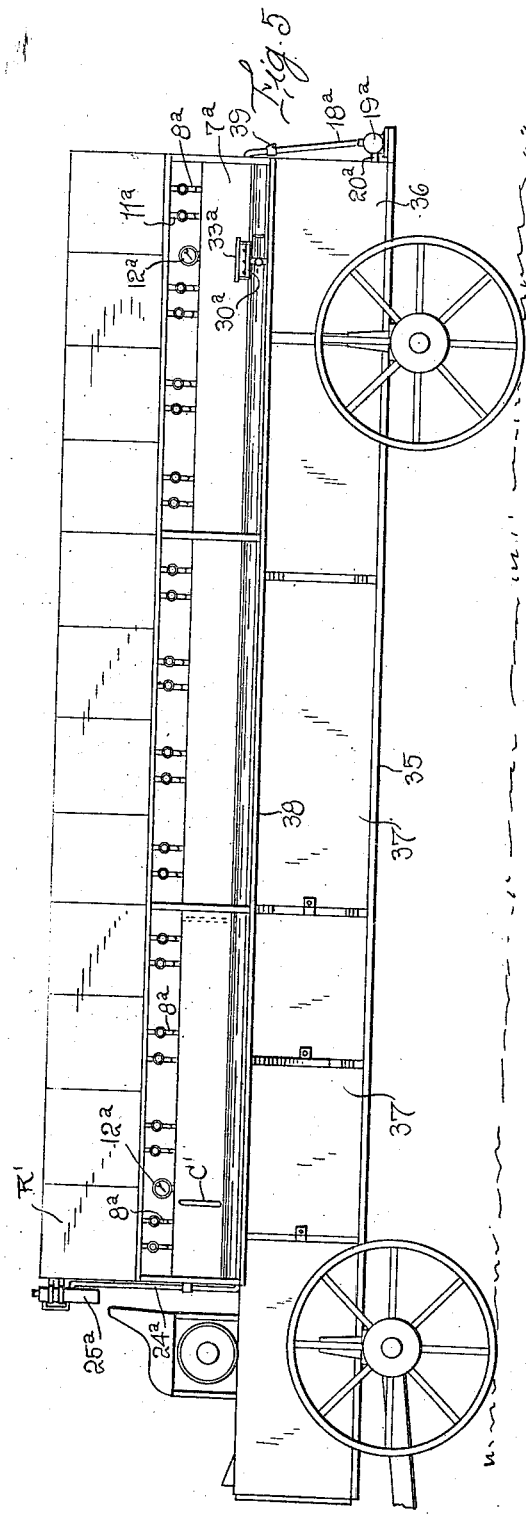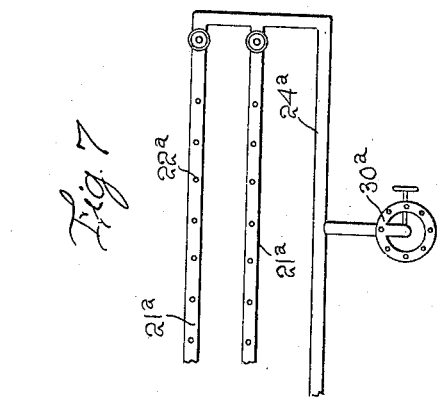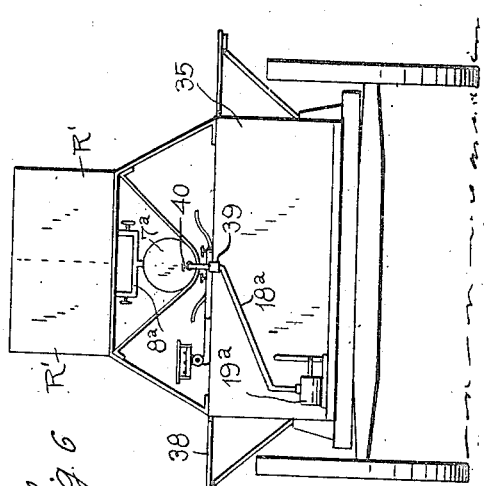

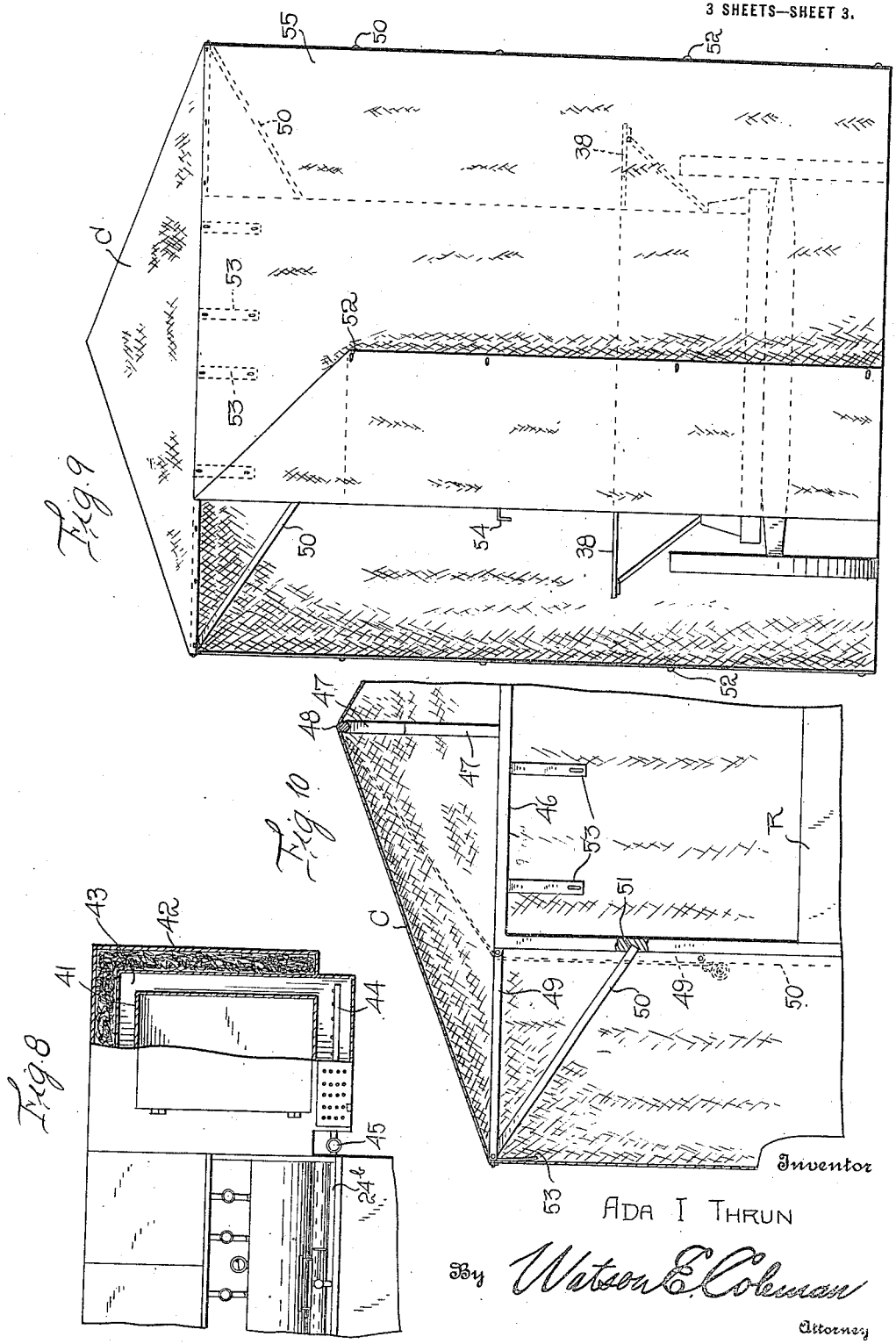

UNITED STATES PATENT OFFICE.

ADA I. THRUN, OF CRAIG, COLORADO.

COOKING APPARATUS.

1,254,376. Specification of Letters Patent. Patented Jan. 22, 1918.

Application filed July 14, 1917. Serial No. 180,638.

*To all whom it may concern:*

Be it known that I, ADA I. THRUN, a citizen of the United States, residing at Craig, in the county of Moffat and State of Colorado, have invented certain new and useful Improvements in Cooking Apparatus, of which the following is a specification, reference being had to the accompanying drawings.

This invention relates to certain improvements in cooking apparatus and has relation more particularly to a device of this general character wherein steam is employed as the heating medium for the cooking chambers and it is an object of the invention to provide a device of this general character having novel and improved means whereby a maximum of efficiency may be obtained with a minimum of fuel.

It is also an object of the invention to provide a novel and improved device of this general character including a heating chamber surrounded by a steam jacket and wherein said steam jacket is in communication with a suitable source of steam supply together with burners for generating the steam.

Furthermore it is an object of the invention to provide a device of this general character provided with novel and improved means whereby a cooking operation may be effected through the medium of dry heat and wherein the dry heat may be controlled independently of the steam heat.

A still further object of the invention is to provide a novel and improved device of this general character of a portable type together with a canopy for substantially entirely inclosing the device and whereby said canopy may be readily and conveniently adjusted to facilitate transportation.

The invention consists in the details of construction and in the combination and arrangement of the several parts of my improved cooking apparatus wherein certain important advantages are attained and the device rendered simpler, less expensive and otherwise more advantageous and convenient for use, as will be hereinafter more fully set forth.

The novel features of my invention will hereinafter be definitely claimed.

In order that my invention may be the better understood I will now proceed to describe the same with reference to the accompanying drawings, wherein—

Figure 1 is a view partly in elevation and partly in section illustrating a cooking apparatus constructed in accordance with an embodiment of my invention;

Fig. 2 is a sectional view taken substantially on the line 2—2 of Fig. 1;

Fig. 3 is a sectional view taken substantially on the line 3—3 of Fig. 2;

Fig. 4 is a fragmentary view in top plan illustrating in detail the mounting of the gas generator;

Fig. 5 is a view in side elevation of a cooking apparatus constructed in accordance with a further embodiment of my invention;

Fig. 6 is a view in rear elevation of the device as illustrated in Fig. 5;

Fig. 7 is a fragmentary view in top plan of the burners as employed in the second form of my invention;

Fig. 8 is a fragmentary view partly in side elevation and partly in section illustrating a further embodiment of my invention;

Fig. 9 is a view in rear elevation illustrating the use of a canopy in connection with the form of my invention as is particularly illustrated in Fig. 5; and Fig. 10 is a fragmentary view partly in section and partly in elevation illustrating certain details of the canopy structure, a second position of certain of the parts being indicated by dotted lines.

As is particularly illustrated in Figs. 1 to 4 B denotes a base of any ordinary or preferred construction and which has extending upwardly from the opposite sides thereof the plates 1 affording a support for the receptacle R provided with the double walls 2 having arranged therebetween suitable heat insulating material 3. Co-acting with the upper or top of the box or receptacle R is a lid or closure member 4 also comprising double walls having suitable heat insulating material interposed therebetween. Extending within the box or receptacle R is a container 5 suitably spaced from the inner wall 2 of the box or receptacle R to provide a steam chamber S substantially entirely surrounding the container 5. Snugly fitting within the container 5 are the nested vessels 6 in which is adapted to be placed the food or the like to be cooked.

Supported by the plates 1 intermediate the base B and the box or receptacle R is a boiler 7 preferably cylindrical in form and as herein disclosed the plates 1 constitute the heads of said boiler. Leading from the top or crown portion of the boiler 7 is a pipe 8 which extends within the chamber S through the bottom thereof and interposed in said pipe is a globe valve 9 or the like. The pipe 8 preferably terminates a predetermined distance above the bottom of the chamber S. Also in communication with the chamber S through the bottom thereof is a pipe 10 which extends within the boiler 7 and terminates adjacent the bottom thereof. The pipe 10 serves to return within the boiler 7 the water of condensation. Interposed in the pipe 10 is a controlling valve 11. The boiler 7 is provided with a pressure gage 12 of any preferred type and also with a blow off 14 and a normally closed filling vent 15. In communication with an end of the boiler 7 as at 16 is a water gage G. Also in communication with the boiler 7 through an end thereof, as at 17 is a feed pipe 18 leading from the force pump 19 and which pump is in communication with a suitable source of water supply as indicated at 20. The pump 19 affords means whereby water may be fed into the boiler 7 when the same is under steam pressure.

Positioned below the boiler 7 and extending longitudinally thereof are the substantially parallel elongated pipes 21 provided with the upstanding burners 22. The corresponding ends of the pipes 21 are in communication with a cross pipe 23 in communication with a pipe 24 leading from a suitable source of gas supply. In the present embodiment of my invention it is preferred that acetylene gas be employed and for which reason the pipe 24 is in communication with the gas chamber of the generator 25. The generator 25 is held to a side wall of the box or receptacle R through the medium of the bracket 26. The generator 25 may be of any ordinary or preferred type including a needle valve 27 for controlling the discharge of water to the carbid. Co-acting with each of the pipes 21 is a controlling valve 28.

When it is desired to employ my improved cooking apparatus gas is created by the generator 25 and delivered to the burners 22 through the pipes 24 and 21 so that the water within the boiler 7 may be generated into steam. The steam generated within the boiler is then supplied to the steam chamber S. When a sufficient heat is obtained within the chamber S the valve 27 of the generator 25 is adjusted to stop the feed of water to the carbid so that within a short time the burners 22 will be extinguished so that the cooking operation will be continued in the nature of a fireless cooker.

The base B is provided with an outstanding shelf or table 29 upon which is mounted the coil 30 provided with the upstanding burners 31. The coil 30 is in communication with the pipe 24 and has interposed therein the controlling valve 32. Arranged above the coil 30 is a grid 33 or the like upon which a receptacle such as a coffee or tea pot may be rested. The coil 30 affords a means whereby a cooking operation may be effected through the medium of a dry heat.

Supported by the base B and underlying the pipes 21 is the plate 34 curved in cross section and extending beyond the opposite sides of the boiler and which serves to direct the heat of the burners 22 toward the boiler 7 and which also serves to reduce to a minimum the possibility of anything being ignited by the flames of the burners 22.

In the form of invention as illustrated in Figs. 5, 6 and 7 I disclose a cooking apparatus of a portable type and wherein the wall supported body 35 provided at one end with a water tank 36 and intermediate its length with suitable compartments 37 for containing food or other accessories for the apparatus. Suitably positioned above the body 35 are the longitudinally disposed parallel series of cooking receptacles or boxes R' each of a construction substantially identical as has been set forth in connection with the box or receptacle R. Each of these receptacles R' are in communication with the boiler 7ª extending longitudinally thereof and positioned therebeneath. The steam generated within the boiler 7ª is delivered to the receptacles R' through the medium of the valve controlled pipes 8ª and the water of condensation is returned from said receptacles R' to the boiler 7ª through the valve controlled pipes 11ª. One end of the boiler 7ª has in communication therewith a pipe 18ª leading from a force pump 19ª which is in communication with the water tank 36 through the medium of the pipe 20ª. The boiler 7ª is also provided with the water gage C' and with the steam gages 12ª.

Underlying the boiler 7ª are the pipes 21ª provided with the upstanding burners 22ª and said pipes are in communication with the pipe 24ª leading from the generator 25ª. The pipe 24ª also has in communication therewith the coil 30ª having co-acting therewith a grid 33ª or the like to afford means whereby coffee or the like may be heated.

Co-acting with each side of the body 35 is an outstanding shelf or table 38 to facilitate the work incidental to cooking.

I find it of advantage to interpose in the pipe 18ᵃ a check valve 39 to prevent retrograde flow through the pipe 18 and also a controlling valve 40.

In the form of invention as illustrated in Fig. 8 the rear portion of the apparatus is provided with an oven 41 positioned within the housing 42. The housing 42 and oven 41 are spaced apart to afford the heating plates 43. Positioned below the oven 41 and within the housing 42 is a burner 44 in communication with the pipe 24ᵇ and under control of the valve 45. In Figs. 9 and 10 I illustrate a canopy adapted to be employed in connection with a form of my invention as especially illustrated in Fig. 5. Each end portion of the series of receptacles R' is provided with an upstanding frame 46 provided substantially its transverse center with an upstanding post 47 connected by a ridge pole 48. Each of the frames 46 at its top has pivotally engaged therewith an outstanding and laterally directed arm 49 which co-acts with the bracing arm 50. The inner or free end portion of the bracing arm 50 is adapted to be removably seated within any suitable recess 51 produced in a side bar of the frame 46. Co-acting with the ridge pole 48 and the arms 49 is a canopy C the end and side walls of which being adapted to be connected through the medium of suitable separable fastening means as indicated at 52. When not in use the side walls of the canopy are adapted to be rolled upwardly as indicated by dotted lines in Fig. 10 and the arms 49 and 50 drop downward as also indicated by dotted lines in Fig. 10. When the canopy is in this adjustment the device may be readily transported from one locality to the other without interference being offered by the canopy C. The side and end walls of the canopy when rolled are maintained in elevated position in a conventional manner through the medium of the straps 53. In order to facilitate the rolling of each of the end walls 55 of the canopy the vertical marginal portions thereof are separable from the top portion of the canopy as particularly illustrated in Fig. 9 so that said marginal portions may be returned upon the intermediate portion of said end wall. When each set of arms 49 and 50 are in lowered position they are maintained in such position through the medium of the turn buckle 54 in a manner and for a purpose which is believed to be clearly apparent to those skilled in the art to which my invention pertains.

From the foregoing description, it is thought to be obvious that a cooking apparatus constructed in accordance with my invention is particularly well adapted for use by reason of the convenience and facility with which it may be assembled and operated and it will also be obvious that my invention is susceptible of some change and modification without materially departing from the appearance and spirit thereof and for this reason I do not wish to be understood as limiting myself to the precise arrangement and formation of the several parts herein shown in carrying out my invention in practice except as hereinafter claimed.

I claim:

1. A cooking apparatus comprising a receptacle provided with a steam jacket, a boiler in communication with the steam jacket, an elongated burner positioned below the boiler at substantially the transverse center thereof and extending longitudinally of the boiler, and a plate underlying the burner for deflecting the heat of the burner toward the boiler, said plate being curved in cross section and extending beyond opposite sides of the boiler.

2. A cooking apparatus comprising a base, upstanding spaced plates carried by the base, a boiler positioned between and supported by the plates at a predetermined distance above the base, said plates serving as heads for the boiler, a receptacle supported by the plates above the boiler, said receptacle being provided with a steam jacket in communication with the boiler, and a heating means co-acting with the boiler.

3. A cooking apparatus comprising a base, upstanding spaced plates carried by the base, a boiler positioned between and supported by the plates at a predetermined distance above the base, said plates serving as heads for the boiler, a receptacle supported by the plates above the boiler, said receptacle being provided with a steam jacket in communication with the boiler, a heating means interposed between the base and the boiler, and a plate supported by the base and extending below the heating means, said plate being curved in cross section and extending beyond opposite sides of the boiler.

4. A cooking apparatus comprising a portable body, a boiler supported by the body, a receptacle supported by the body above the boiler and provided with a steam jacket in communication with the boiler, a heating means supported by the body and positioned intermediate the base and boiler, and a deflecting plate supported by the body and underlying the heating means, said plate being curved in cross section and extending beyond opposite sides of the boiler.

5. A cooking apparatus comprising a portable body, a boiler supported by the body, a receptacle supported by the body above the boiler and provided with a steam jacket in communication with the boiler, a heating means supported by the body and positioned intermediate the base and boiler, a deflecting plate supported by the body and underlying the heating means, said plate being curved in cross section and extending beyond opposite sides of the boiler, a source of water supply carried by the body, and a feeding means leading from the source of water supply to the boiler.

6. A cooking apparatus comprising a portable body, a boiler supported by the body, a receptacle supported by the body above the boiler and provided with a steam jacket in communication with the boiler, a heating means supported by the body and positioned intermediate the base and boiler, a deflecting plate supported by the body and underlying the heating means, said plate being curved in cross section and extending beyond opposite sides of the boiler, and a laterally directed shelf carried by the portable body below the boiler.

In testimony whereof I hereunto affix my signature in the presence of two witnesses.

MRS. ADA I. THRUN.

Witnesses:
WALTER S. PRICE,
C. W. THRUN.

Copies of this patent may be obtained for five cents each, by addressing the "Commissioner of Patents, Washington, D. C."